United States Patent [19]

Watanabe

[11] Patent Number: 4,477,124

[45] Date of Patent: Oct. 16, 1984

[54] SPEED-RESPONSIVE RETARDER CONTROL SYSTEM PROVIDING FOR OVERHEAT PREVENTION

[75] Inventor: Masahiro Watanabe, Yokohama, Japan

[73] Assignee: Kabushiki Kaisha Komatsu Seisakusho, Tokyo, Japan

[21] Appl. No.: 332,735

[22] Filed: Dec. 21, 1981

[30] Foreign Application Priority Data

Dec. 27, 1980 [JP] Japan .................. 55-185053

[51] Int. Cl.³ .................................... B60T 8/02
[52] U.S. Cl. ..................................... 303/100; 303/95
[58] Field of Search ............... 303/1, 20, 22 R, 93–96, 303/100, 101, 102, 103, 106

[56] References Cited

U.S. PATENT DOCUMENTS 3,719,246 3/1973 Bott ....................... 303/100 X

*Primary Examiner*—Duane A. Reger

*Attorney, Agent, or Firm*—Armstrong, Nikaido, Marmelstein & Kubovcik

[57] ABSTRACT

In response to the actuation of a speed control lever by the vehicle operator, a potentiometer puts out a speed setting signal indicative of a desired vehicle speed. A control circuit responds to this speed setting signal, as well as signals representative of the actual vehicle speed and of the temperature of the retarder fluid, by putting out a first braking signal, corresponding to the difference between the desired and actual vehicle speeds, and a second braking signal corresponding to the difference between the actual acceleration of the vehicle and a preset acceleration. Under the control of the control circuit a selector normally passes the first braking signal and, when either the temperature of the retarder fluid or its temperture rise gradient exceeds a preset maximum, the second braking signal. The first or second braking signal is proportionately translated into a hydraulic pressure for actuation of a retarder. The second braking signal is intended to prevent the overheating of the retarder as when the vehicle is traveling down a long or steep slope.

9 Claims, 2 Drawing Figures

SPEED-RESPONSIVE RETARDER CONTROL SYSTEM PROVIDING FOR OVERHEAT PREVENTION

BACKGROUND OF THE INVENTION

The present invention concerns an automatic control system for a supplemental brake system known as a retarder incorporated in dump trucks or like motor vehicles.

Dump trucks for ore transportation from mines usually take resort to the retarder for controlling the vehicle speed while going downhill. The vehicle operator has heretofore relied on his own discretion in manipulating the retarder. The degree to which the retarder actually retards the vehicle, however, varies greatly depending upon the gradient of the slope and the load on the vehicle. It has therefore been difficult for the operator to effect optimum control of the vehicle speed in accordance with the specific conditions of the road and the vehicle. Thus, while the vehicle is traveling down a long or steep slope, the retarder has been easy to overheat, eventually resulting in the rupture of the brake discs in the worst case.

SUMMARY OF THE INVENTION

This invention remedies the noted and other drawbacks of the prior art by automating the control of a retarder in a motor vehicle such as a dump truck. It also solves the problem of how to prevent the overheating and eventual rupture of the retarder while the vehicle is traveling down a long or steep slope.

Stated in brief, the invention provides a control system for a fluid-actuated retarder, comprising a speed setter for putting out a speed setting signal representative of a desired vehicle speed in response to the actuation of a speed control lever or like means by the vehicle operator. A control circuit inputs the speed setting signal from the speed setter, as well as an actual speed signal representative of the actual traveling speed of the vehicle from a speed sensor and a temperature signal representative of the temperature of the retarder fluid from a temperature sensor. Put out by the control circuit are a first braking signal corresponding to the difference between the speed setting signal and the actual speed signal, and a second braking signal of smaller magnitude than the first. Connected in a subsequent stage of the control circuit and controlled thereby, selector means normally allow the passage therethrough of the first braking signal and, in the event of a prescribed change in the temperature of the retarder fluid as represented by the temperature signal, the second braking signal from the control circuit. The first or second braking signal is proportionately translated into a fluid pressure for the actuation of the retarder.

In a preferred embodiment the selector means pass the second braking signal when the temperature of the retarder fluid, or its temperature rise gradient, exceeds a predetermined limit. The second braking signal corresponds to the difference between the actual acceleration of the vehicle and a preset acceleration. Thus, whenever the temperature of the retarder fluid becomes too high or rises too rapidly during the application of the retarder, the second braking signal of smaller magnitude than the first is converted into a corresponding fluid pressure for the application of the retarder to a reduced degree. The temperature of the retarder fluid will decrease during such use of the second braking signal. The vehicle operator is supposed to use the usual foot brake, as required, during the application of the reduced fluid pressure to the retarder. When the temperature of the retarder fluid or its temperature rise gradient subsequently becomes less than the prescribed limit, the control system resumes controlling the retarder in accordance with the difference between the desired and the actual vehicle speeds.

It will have been seen that the control system of this invention effectively provides for the protection of the retarder against overheating while the vehicle is traveling down a long or steep slope. Further, if the temperature of the retarder fluid does not become too high or rise too rapidly while the vehicle is going downhill, the operator can concentrate on steering, the vehicle speed being automatically controlled by the retarder control system.

The above and other features and advantages of this invention will become more apparent, and the invention itself will best be understood, from the following description of the specific embodiment illustrated in the attached drawings.

DESCRIPTION OF THE PREFERRED EMBODIMENT

Figure 1:
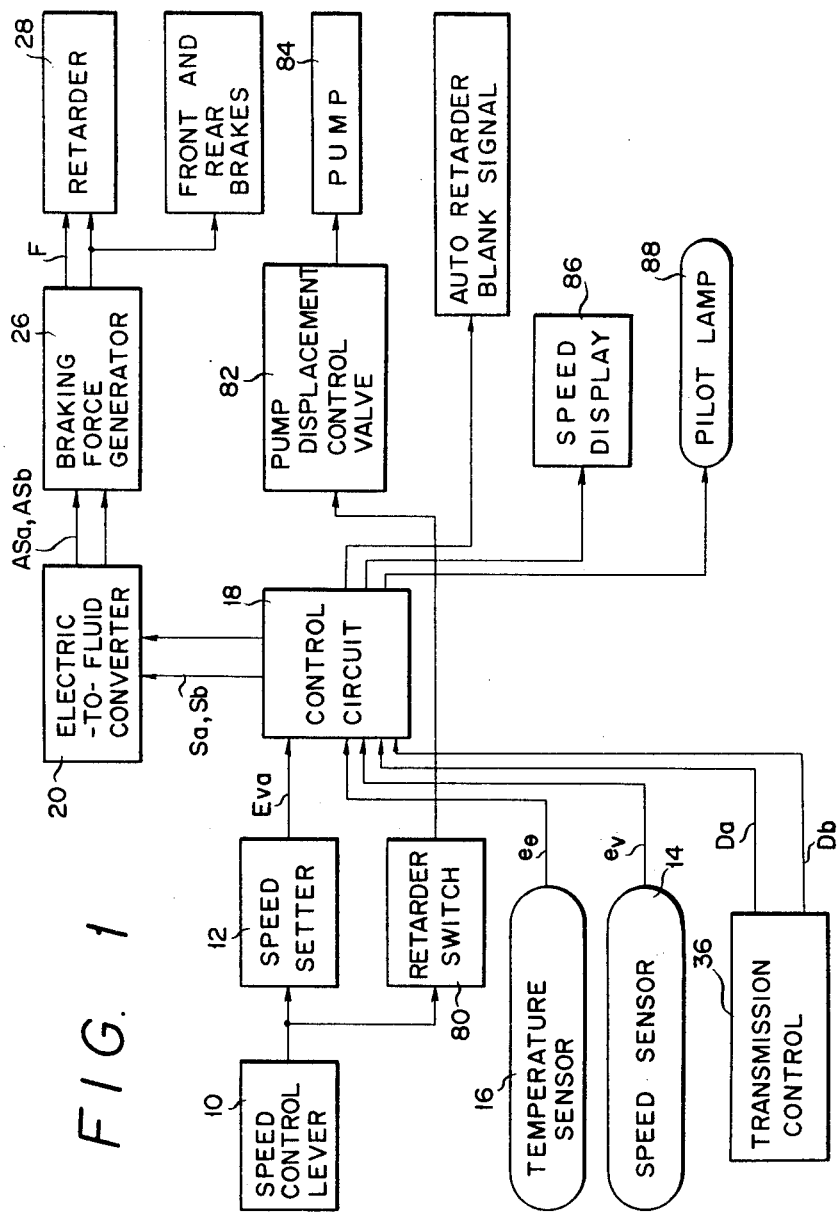
FIG. 1 is a block diagram explanatory of the principles of the retarder control system in accordance with the invention.
Figure 2:
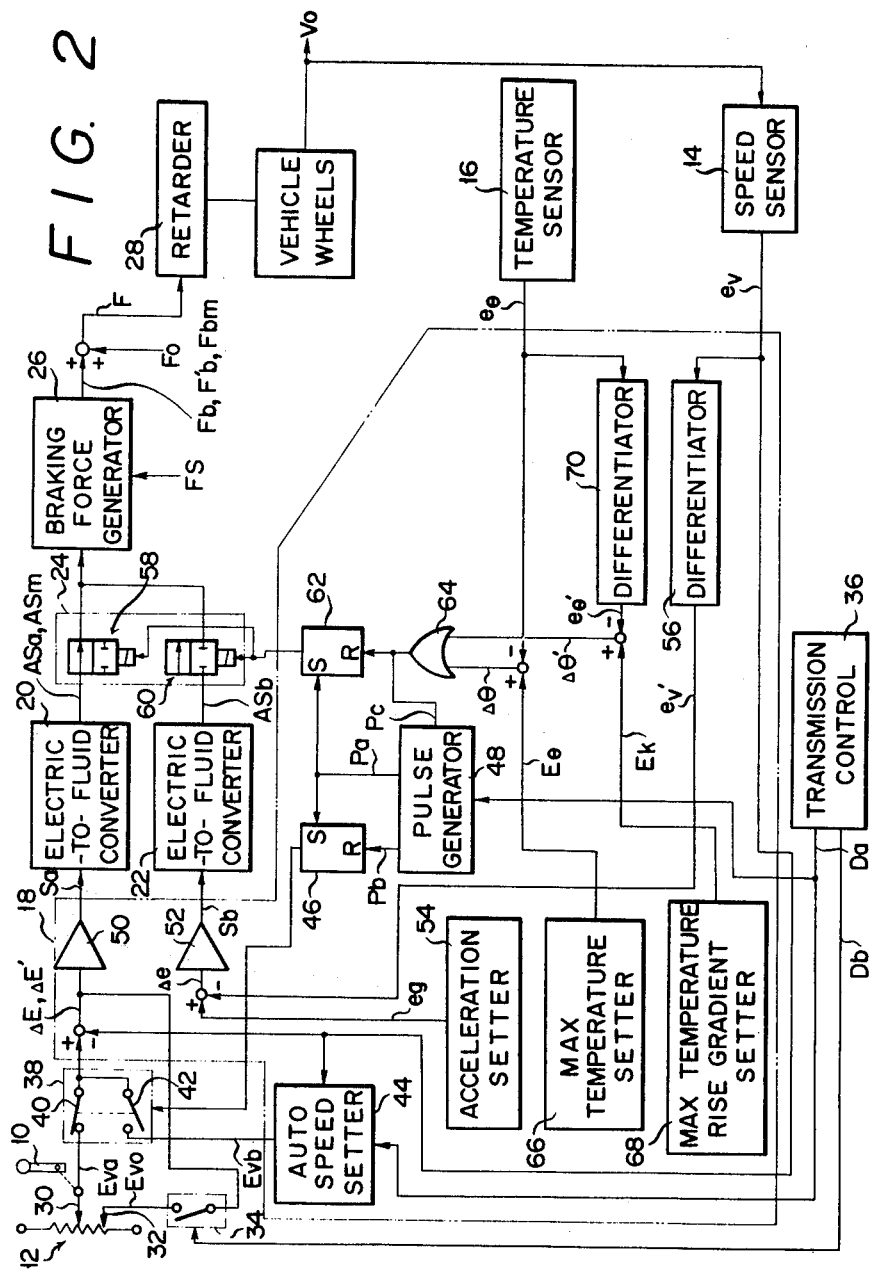
FIG. 2 is a schematic representation, partly in block diagrammatic form, of a preferred form of the retarder control system constructed in accordance with the inventive principles of FIG. 1.

While FIG. 1 illustrates the principles underlying the present invention, they will be better understood from a study of a more specific embodiment given in FIG. 2, for FIG. 1 is only intended to show the retarder control system quite generally and as simply as possible. Reference will be later directed to FIG. 1 in order to describe parts not appearing in FIG. 2. The embodiment of FIG. 2 broadly comprises:

1. A speed control lever 10 for manual actuation by the operator of the vehicle, usually a dump truck.

2. A speed setter 12 associated with the speed control lever 10 for putting out an electric speed setting signal $E_{va}$ representative of a desired vehicle speed as selected by the vehicle operator.

3. A speed sensor 14 for putting out an electric actual speed signal $e_v$ representative of the actual traveling speed $V_o$ of the vehicle.

4. A temperature sensor 16 for putting out an electric temperature signal $e_\theta$ representative of the temperature of the retarder fluid.

5. A control circuit 18 for putting out an electric first braking signal $S_a$ and second braking signal $S_b$ in response to the speed setting signal $E_{va}$ and the actual speed signal $e_v$.

6. First 20 and second 22 electric-to-fluid converters for translating the first $S_a$ the second $S_b$ braking signals into corresponding fluid signals $AS_a$ and $AS_b$ respectively.

7. Selector valve means 24 under the control of the control circuit 18 for normally permitting the passage therethrough of the first fluid signal $AS_a$ from the first electric-to-fluid converter 20 and, in the event of a prescribed change in the retarder fluid temperature as represented by the temperature signal $e_\theta$, the second fluid signal $AS_b$ from the second electric-to-fluid converter 22.

8. A braking force generator 26 responsive to the fluid signals $AS_a$ and $AS_b$ for producing corresponding hydraulic fluid pressures $F_b$ and $F_b'$ for actuation of a retarder 28.

The speed setter 12 can take the form of a potentiometer, as shown, having a sliding contact 30 interlocked with the speed control lever 10 for providing the speed setting signal $E_{va}$. The potentiometer has another contact 32 connected to a normally open switch 34. When this switch is closed by an overrun signal $D_b$ from a transmission control 36, as in the event of an excessive rise in engine speed, the potentiometer puts out a stop signal $E_{vo}$ for fully retarding and stopping the vehicle.

Disposed next to the speed setter 12, an input selector 38 comprises a first switch 40 and a second switch 42. The first switch 40 is connected to the sliding contact 30 of the speed setter 12, and the second switch 42 to an automatic speed setter 44 shown included in the control circuit 18. The automatic speed setter 14 is connected to input the actual speed signal $e_v$ from the speed sensor 14 and a speed gear setting signal $D_a$ from the transmission control 36. It is the office of the automatic speed setter 44 to compare each speed setting by the vehicle operator with a predetermined safe speed range memorized therein and to produce an automatic speed setting signal $F_{vb}$ representative of the highest vehicle speed within the safe speed range. The speed setter 12 and the speed setting signal $E_{va}$ will hereinafter be referred to as the manual speed setter and the manual speed setting signal, respectively, in contradistinction to the automatic speed setter 44 and the automatic speed setting signal $E_{vb}$.

Actuated by the output from a flip-flop circuit 46 in the control circuit 18, the switches 40 and 42 of the input selector 38 make on-off operation in an opposite way. The first switch 40 is closed, and the second switch 42 open, when the flip-flop circuit 46 is set. The first switch 40 is open, and the second switch 42 closed, when the flip-flop circuit 46 is reset. Depending upon the state of the flip-flop circuit 46, therefore, the input selector 38 passes either of the manual speed setting signal $E_{va}$ and the automatic speed setting signal $E_{vb}$.

A timing pulse generator 48 in the control circuit 18 is connected to the inputs of the flip-flop circuit 46, setting same with set pulses $P_a$ and resetting same with reset pulses $P_b$. The generator 48 puts out these timing pulses $P_a$ and $P_b$, as well as pulses $P_c$ to be later referred to, in response to the speed gear setting signal $D_a$ from the transmission control 36.

The control circuit 18 includes an amplifier 50 connected to receive:

1. The difference $\Delta E$ between the manual speed setting signal $E_{va}$ from the manual speed setter 12 and the actual speed signal $e_v$ from the speed sensor 14.

2. The difference $\Delta E'$ between the automatic speed setting signal $E_{vb}$ from the automatic speed setter 44 and the actual speed signal $e_v$ from the speed sensor 14.

3. The stop signal $E_{vo}$ from the switch 34.

The amplifier 50 proportionally integrates and amplifies each of these inputs $\Delta E$, $\Delta E'$ and $E_{vo}$. The indicia $S_a$ denote the first braking signal thus produced by the amplifier 50. The first braking signal normally corresponds to the input $\Delta E$.

Also included in the control circuit 18 is another amplifier 52 connected to receive the difference $\Delta e$ between a preset acceleration signal $e_g$ from an acceleration setter 54 and an actual acceleration signal $e_v'$ from a differentiator 56. The signal $e_g$ represents a preset acceleration for the vehicle. The signal $e_v'$ represents the actual vehicle acceleration as derived by the differentiator 56 from the actual speed signal $e_v$ put out by the speed sensor 14. The output from the amplifier 52 is the second braking signal $S_b$. This output signal corresponds to the preset acceleration signal $e_g$ when the vehicle is running at constant speed.

The first $S_a$ and second $S_b$ braking signals from the control circuit 18 enter the first 20 and second 22 electric-to-fluid converters, respectively, thereby to be converted into corresponding fluid signals $AS_a$ and $AS_b$. These fluid signals can be either hydraulic or pneumatic under normal working conditions of the vehicle. For vehicles expected to work in extremely cold regions, however, the use of a hydraulic fluid is recommended because, otherwise, the moisture contained in air might freeze and impede the proper functioning of the selector valve means 24. Hydraulic signals are also preferred because of their noncompressibility and, in consequence, the quicker response of the system.

Intended to permit selective passage therethrough of the first $AS_a$ and second $As_b$ braking signals in fluid form, the selector valve means 24 comprise first 58 and second 60 solenoid-actuated on-off valves connected to the first 20 and second 22 electric-to-fluid convertors respectively. These valves 58 and 60 are opened and closed in an opposite way by the output from a flip-flop circuit 62 in the control circuit 18. The first valve 58 is open, and the second valve 60 closed, when the flip-flop circuit 62 is set. The first valve 58 is closed, and the second valve 60 open, when the flip-flop circuit 62 is reset. The flip-flop circuit 62 receives the set pulses $P_a$ and reset pulses $P_c$ from the timing pulse generator 48.

The flip-flop circuit 62 also receives a reset signal from an OR gate 64 in the control circuit 18. The OR gate 64 is associated with the temperature sensor 16 and with a maximum allowable temperature setter 66, maximum allowable temperature rise gradient setter 68 and differentiator 70, the last three being all included in the control circuit 18. The setter 66 determines the maximum allowable temperature of the retarder fluid and puts out a signal $E_\theta$ indicative of that temperature. The OR gate 64 receives the difference $\Delta\theta$ between the maximum allowable temperature signal $E_\theta$ and the actual temperature signal $e_\theta$ representative of the actual temperature of the retarder fluid from the temperature sensor 16. The setter 68 determines the maximum allowable temperature rise gradient of the retarder fluid and puts out a signal $E_k$ indicative of that gradient. The differentiator 70 derives the actual temperature gradient of the retarder fluid from the actual temperature signal $e_\theta$ and puts out a signal $e_\theta'$ indicative of the actual temperature rise gradient. The OR gate 64 receives the difference $\Delta\theta'$ between the maximum allowable temperature rise gradient signal $E_k$ and the actual temperature rise gradient signal $e_\theta'$.

The OR gate 64 produces an output pulse for resetting the flip-flop circuit 62 when either of the input signals $\Delta\theta$ and $\Delta\theta'$ is greater than zero, that is, when either the actual temperature or actual temperature rise gradient of the retarder fluid exceeds the corresponding preset maximum. The flip-flop circuit 62 is also reset by the pulses $P_c$, and set by the pulses $P_a$, from the timing pulse generator 48.

On passing the selector valve means 24, the first $AS_a$ or second $AS_b$ braking signals in fluid from enters the braking force generator 26. The generator 26 responds to the input fluid signals $As_a$ or $AS_b$ by producing the hydraulic fluid pressure $F_b$ or $F_b'$ for actuation of the retarder 28.

OPERATION

In the normal use of the retarder 28 the flip-flop circuits 46 and 62 of the control circuit 18 are both set, with the result that the first switch 40 of the input selector 38 is closed, and that the first on-off valve 58 of the selector valve means 24 is open. Thus the manual speed setting signal $E_{va}$ from the manual speed setter 12 enters the control circuit 18. The difference $\Delta E$ between this signal $E_{va}$ and the actual speed signal $e_v$ from the speed sensor 14 is processed by the amplifier 50 and put out as the first braking signal $S_a$. The electric-to-fluid converter 20 transforms the first braking signal $S_a$ into the corresponding fluid signal $AS_a$, for delivery to the braking force generator 26 via the open first valve 58 of the selector valve means 24.

The braking force generator 26 responds to the fluid signal $AS_a$ by producing the corresponding hydraulic fluid pressure $F_b$, which is a predetermined multiple of the input pressure, for application of the retarder 28. The actual braking force, however, is the sum F of the fluid pressure $F_b$ and a total external force $F_o$, the latter being subject to change depending upon the steepness of the slope and the load on the vehicle. The actual braking force F causes the retarder 28 to correspondingly reduce the vehicle speed $V_o$.

The operator's speed setting may be unreasonable in comparison with the actual vehicle speed. Then, in response to the speed gear setting signal $D_a$ put out by the transmission control 36 at the time of a gearshift, the pulse generator 48 produces a pulse $P_b$ for resetting the flip-flop circuit 46. The first switch 40 of the input selector 38 opens, and its second switch 42 closes, upon resetting of the flip-flop circuit 46. Consequently the control circuit 18 inputs the automatic speed setting signal $E_{vb}$ from the automatic speed setter 44 instead of the manual speed setting signal $E_{va}$ from the manual speed setter 12. The difference between the automatic speed setting signal $E_{vb}$ and the actual speed signal $e_v$ is processed as above to actuate the retarder 28. Thus the retarder is controlled within the safe speed range.

During such application of the retarder 28 the temperature of the retarder fluid will rise either gradually or rapidly. The OR gate 64 resets the flip-flop circuit 62 if the temperature of the retarder fluid or its temperature rise gradient exceeds the corresponding preset limit. The result is the closure of the first valve 58, and the opening of the second valve 60, of the selector valve means 24. Let it be assumed that the vehicle is now running at constant speed. Then the fluid second braking signal $AS_b$ passing the open second valve 60 corresponds to the preset acceleration signal $e_g$ from the accerleration setter 54. The fluid signal $AS_b$ causes the braking force generator 26 to produce the hydraulic fluid pressure $F_b'$, which is smaller than the pressure $F_b$ generated when both the temperature of the retarder fluid and its temperature rise gradient are normal. The retarder fluid will cool while the vehicle is running with the retarder applied to a reduced degree. The operator may use the usual foot brake to control the vehicle speed pending the cooling of the retarder fluid. It is understood that the braking force generator 26 gives priority to the foot brake signal FS, producing braking pressure corresponding thereto.

The flip-flop circuit 62 is automatically reset when the temperature of the retarder fluid or its temperature rise gradient drops below the preset limit. Thereupon the first selector valve 58 opens, and the second selector valve 60 closes, so that the control system resumes automatic control of the retarder in accordance with the difference between desired and actual vehicle speeds.

Vehicle riders in general are known to experience a disagreeable sensation when the acceleration of the vehicle exceeds 0.2 G. Braking or retarding force should therefore be limited to guard the vehicle operator from such a sensation. Thus, in response to the signal $D_a$ produced by the transmission control 36 at the time of a downshift, the pulse generator 48 puts out a reset pulse $P_c$ for resetting the flip-flop circuit 62, with the consequent closure of the first selector valve 58 and the opening of the second selector valve 60. The fluid second braking signal $AS_b$ passing the open second selector valve 60 corresponds to the difference $\Delta e$ between the preset acceleration signal $e_g$ from the acceleration setter 54 and the actual acceleration signal $e_v'$ from the differentiator 56. The fluid second braking signal $AS_b$ is always of smaller magnitude than the fluid first braking signal $AS_a$. In response to this second braking signal the braking force generator 26 produces the hydraulic fluid pressure $F_b'$, which of course is less than the pressure $F_b$. Thus is the vehicle operator protected against the disagreeable sensation.

In the event of an undue rise in engine speed the transmission control 36 puts out the overrun signal $D_b$ for closing the switch 34. The closure of this switch results in the direct application of the stop signal $E_{vo}$ to the amplifier 50 of the control circuit 18. The amplifier 50 puts out the stop signal $E_{vo}$ as the first braking signal $S_a$. The electric-to-fluid converter 20 responds to the stop signal by producing a maximum fluid pressure signal $AS_m$, for delivery to the braking force generator 26 via the first selector valve 58. The corresponding fluid pressure from the generator 26, designated $F_{bm}$, is also the highest, enough to bring the vehicle to a stop. An accident is thus forestalled.

FIG. 1 shows at 80 a retarder switch interlocked with the speed control lever 10. Closed during the operation of the retarder 28, the retarder switch 80 acts on a pump displacement control valve 82 to cause same to maximize the per-cycle displacement of a pump 84. The increase in the flow rate of the retarder fluid during the application of the retarder serves to slow the heating of the fluid. The control circuit 18 is electrically connected to a display 86 on the dashboard of the vehicle for visual presentation of speed settings for the vehicle. Also electrically connected to the control circuit 18, a pilot lamp 88 glows during automatic operation of the retarder.

Figure 3:
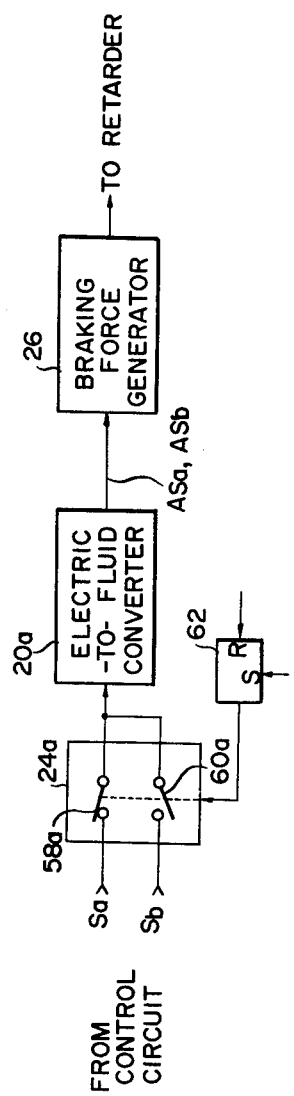
FIG. 3 is a partial schematic representation of a slight modification of the retarder control system of FIG. 2.

In FIG. 3 is given a slight modification of the FIG. 2 embodiment. The modification features a selector switch circuit 24a employed instead of the selector valve means 24 of the preceding embodiment. The selector switch circuit 24a comprises first 58a and second 60a switches to be opened and closed oppositely under the control of the flip-flop circuit 62. The first switch 58a is closed when the flip-flop circuit 62 is set, passing the electric first braking signal $S_a$ from the control circuit on to an electric-to-fluid converter 20a. When the flip-flop circuit 62 is reset, on the other hand, the second switch 60a is closed to pass the electric second braking signal $S_b$ from the control circuit on to the electric-to-fluid converter 20a. In response to these input signals $S_a$ and $S_b$ the converter 20a puts out the corresponding fluid signals $AS_a$ and $AS_b$ for application to the braking force generator 26.

Thus, in accordance with the invention, the braking signals $S_a$ and $S_b$ from the control circuit 18 can be converted from electric to fluid form either before or after passing the selector means 24 or 24a. The modification in FIG. 3 offers the advantage of simpler construction as it requires only one electric-to-fluid converter and dispenses with solenoid valves.

Additional modifications and variations of the invention will be readily recognized by those skilled in the art to conform to system requirements or design considerations, without departure from the spirit or scope of the invention as expressed in the following claims.

What is claimed is:

1. In a motor vehicle equipped with a fluid-actuated retarder, a control system comprising:
   (a) speed control means for actuation by a vehicle operator;
   (b) a speed setter responsive to the actuation of the speed control means for putting out a speed setting signal representative of a desired speed of the vehicle;
   (c) a speed sensor for putting out an actual speed signal representative of the actual traveling speed of the vehicle;
   (d) a temperature sensor for putting out a temperature signal representative of the temperature of a retarder fluid;
   (e) a control circuit connected to input the speed setting signal from the speed setter, the actual speed signal from the speed sensor, and the temperature signal from the temperature sensor, the control circuit putting out a first braking signal, corresponding to the difference between the speed setting signal and the actual speed signal, and a second braking signal of smaller magnitude than the first braking signal;
   (f) selector means under the control of the control circuit for normally permitting the passage therethrough of the first braking signal from the control circuit and, in the event of a prescribed change in the temperature of the retarder fluid as represented by the temperature signal, the second braking signal from the control circuit; and
   (g) a braking force generator responsive to the first or second braking signal from the selector means for proportionately generating a braking force for actuation of the retarder.

2. The retarder control system as recited in claim 1, wherein the control circuit comprises means for causing the selector means to pass the second braking signal when the temperature of the retarder fluid exceeds a preset maximum.

3. The retarder control system as recited in claims 1 or 2, wherein the control circuit comprises means for causing the selector means to pass the second braking signal when the temperature rise gradient of the retarder fluid exceeds a preset maximum.

4. The retarder control system as recited in claim 1, wherein the control circuit comprises means for putting out the second braking signal in accordance with the difference between the actual acceleration of the vehicle and a preset acceleration.

5. The retarder control system as recited in claim 1, further comprising:
   (a) means for putting out a second speed setting signal representative of a speed setting for the vehicle determined within a prescribed safe speed range; and
   (b) means under the control of the control circuit for normally permitting the inputting of the first recited speed setting signal to the control circuit and for permitting the inputting of the second speed setting signal to the control circuit in event the speed setting by the vehicle operator is unreasonable in comparison with the actual speed of the vehicle.

6. The retarder control system as recited in claim 1, further comprising means for delivering to the control circuit an overrun signal in the event of an overrun of the vehicle, the control circuit responding to the overrun signal by putting out a corresponding stop signal in lieu of the first braking signal for causing the braking force generator to produce a full braking force for stopping the vehicle.

7. In a motor vehicle such as a dump truck equipped with a fluid-actuated retarder, a control system comprising:
   (a) speed control means for manual actuation by a vehicle operator;
   (b) a speed setter responsive to the actuation of the speed control means for putting out an electric speed setting signal representative of a desired speed setting for the vehicle;
   (c) a speed sensor for putting out an electric actual speed signal representative of the actual traveling speed of the vehicle;
   (d) a temperature sensor for putting out an electric temperature signal representative of the temperature of a retarder fluid;
   (e) a control circuit connected to input the speed setting signal from the speed setter, the actual speed signal from the speed sensor, and the temperature signal from the temperature sensor, the control circuit putting out an electric first braking signal, corresponding to the difference between the speed setting signal and the actual speed signal, and an electric second braking signal of smaller magnitude than the first braking signal;
   (f) means for converting the first and second braking signals from electric to fluid form;
   (g) selector means under the control of the control circuit for normally permitting the passage therethrough of the first braking signal from the control circuit and, when the temperature or the temperature rise gradient of the retarder fluid exceeds a preset maximum, of the second braking signal from the control circuit, the first and second braking signals selectively passing the selector means either before or after conversion from electric to fluid form; and
   (h) a braking force generator responsive to the first or second braking signal for generating a corresponding braking force for actuation of the retarder.

8. The retarder control system as recited in claim 7, wherein the first and second braking signals selectively pass the selector means after conversion from electric to fluid form, and wherein the selector means comprises valve means interposed between the converting means and the braking force generator.

9. The retarder control system as recited in claim 7, wherein the first and second braking signals selectively pass the selector means before conversion from electric to fluid form, and wherein the selector means comprises electric switch means interposed between the control circuit and the converting means.

* * * * *